July 26, 1966

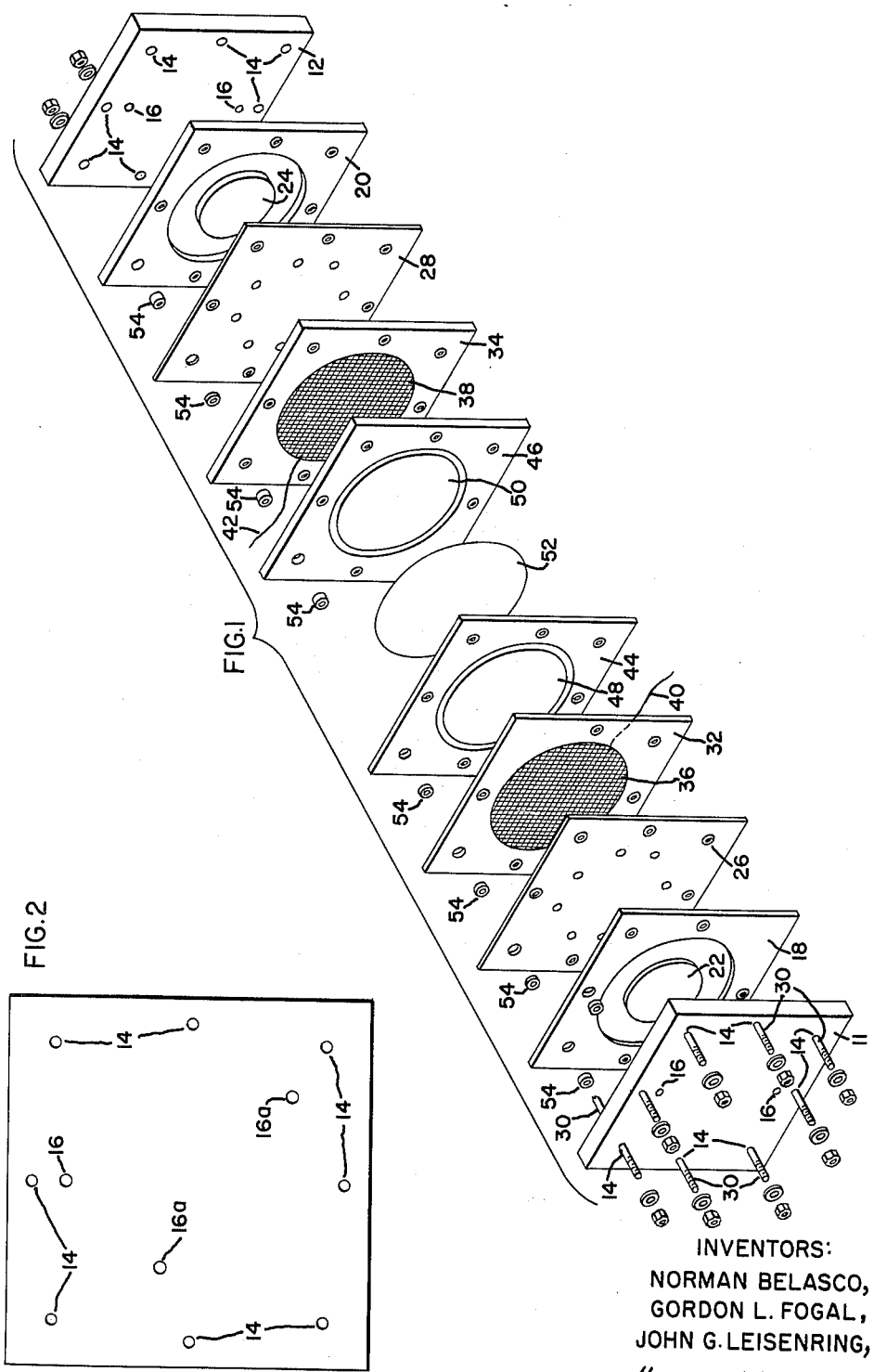

N. BELASCO ET AL 3,262,869

PROCESS OF PRODUCING POTABLE WATER FROM URINE BY
ELECTROCHEMICAL MEANS

Filed Sept. 28, 1961

INVENTORS:
NORMAN BELASCO,
GORDON L. FOGAL,
JOHN G. LEISENRING,

BY  Henry W. Kaufmann
THEIR AGENT.

3,262,869
PROCESS OF PRODUCING POTABLE WATER FROM URINE BY ELECTROCHEMICAL MEANS
Norman Belasco, Springfield, and Gordon Lee Fogal and James Greig Leisenring, Wayne, Pa., assignors to General Electric Company, a corporation of New York
Filed Sept. 28, 1961, Ser. No. 141,494
3 Claims. (Cl. 204—101)

This invention pertains to the art of water purification.

Natural purification of water by distillation by solar energy is, obviously prehistoric in origin. Reliance, conscious or unconscious, upon combined filtration through the ground and action of soil bacteria to render sewage fluids non-pathogenic and permit them to pass without septic effects to the ground water supply is also some centuries old. Human needs for potably pure water have been met by residence in the vicinity of natural sources, or by transportation of potable natural water to the place of need, or by the conversion of non-potable natural water (such as sea-water) into a desalinated form, initially by distillation, more recently by selective electrolytic or other removal of the ionized salts from solution. The general abundance of water on the earth's surface has rendered the direct use of the water content of excretions a field little explored and having little technology specific to it. However, the increasing population of the earth's surface and the desire to provide for human survival remote from the earth's surface both render a simple means of deriving usefully pure water from human or other animal excretions desirable. Efforts in this direction have been made by others, primarily employing ingenious modifications of or additions to conventional means such as distillation. Our invention applies to such purification a technique not previously used for the purification of biologically impure water; and it has the advantage that it is capable of integration into and cooperation with the energy storage system of an isolated vehicle or life chamber.

It has long been known that water may be electrolyzed into hydrogen and oxygen, and also that these gases may, by the use of suitable catalysts, be caused to recombine in an electrolytic cell to produce electrical energy. A cycle of water electrolysis to hydrogen and oxygen and recombination of hydrogen and oxygen into water has previously been proposed as a means of storing electrical energy which is available only intermittently (as from wind, tidal, or solar power). However, the use of electrolysis as a means of separating pure water from an impure solution has not previously been undertaken. In the first place, there are many impurities which, if present in large quantities, would interfere with the production of pure hydrogen and oxygen; large amounts of ordinary sodium chloride, for example, would cause the production of chlorine at the electrode where one would expect oxygen to appear; and the product of recombination would contain objectionable quantities of hydrogen chloride. Also, conventional thinking would lead one to expect that increasing concentration of impurities would ultimately render the conductivity of the impure solution so low as to impede the electrolysis. We have found in fact that water in representative human urine may be purified by electrolysis continuing over long periods of time without the necessity of discarding the concentrated impurities remaining behind in the electrolytic cell. Furthermore, we have devised ways of reducing the total energy consumption required for electrolytic purification, or alternatively of combining the operation of electrolysis with energy storage; and lastly, we have incorporated a technique for continuously removing some of the impurities remaining in the cell without the necessity of draining the cell for the purpose.

Thus one object of our invention is to extract potably pure water from biologically and chemically impure (and aesthetically offensive) liquid water-containing biological waste (of which urine is the most readily collected in quantity, although sweat and tears could also be used if available) by a process which need not be gravity-dependent, which is controllable without lags in response (such as thermal lags in response to the change of distillation energy input to a distillation system), and which achieves the convenience of electrolysis without the wasteful energy consumption which results if hydrogen and oxygen are combined by some means which either wastes their energy of recombination or utilizes it much less efficiently than the fuel cell. Obviously, there may be certain applications in which not all these features are required; there may be certain others in which features not mentioned in the preceding (such as the possibility of incorporating the practice of our invention in the use of fuel cells on a vehicle) are deemed of importance; but it is not believed that full teaching requires semantic manipulations to point out the various advantages of our invention which will be obvious to those concerned with this problem.

For the better understanding and explanation of our invention, we have provided figures of drawing in which:

FIG. 1 represents in exploded or disassembled form, an electrolytic cell adapted for use in the embodiment of our invention;

FIG. 2 represents an end plate suitable for the construction of an alternate or variant form of the representation of FIG. 1;

Figure 3:
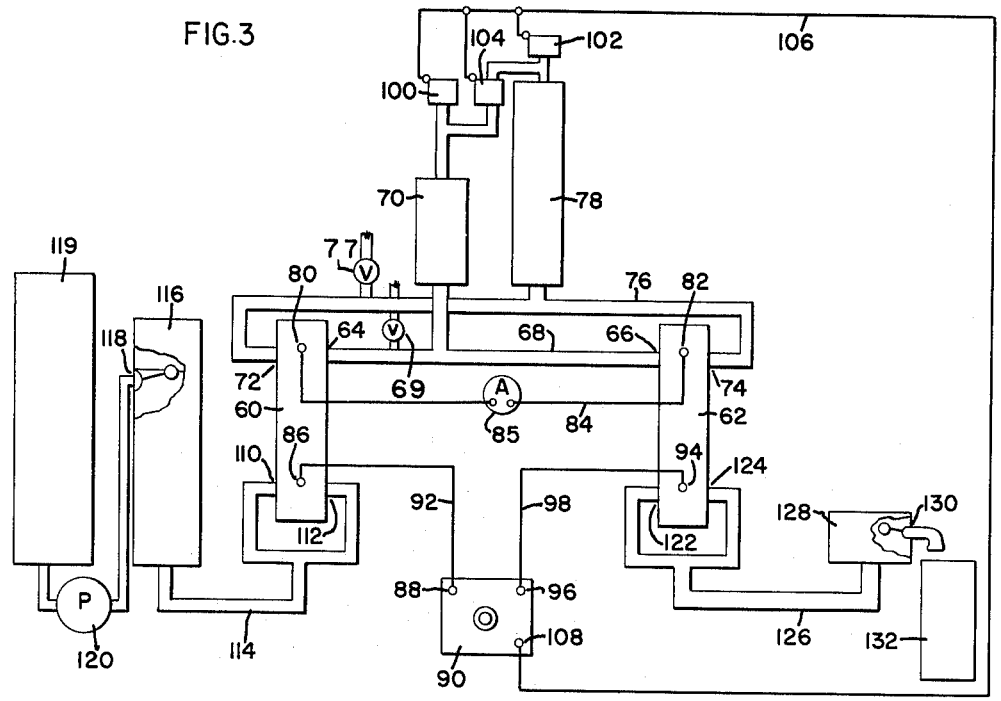
FIG. 3 represents schematically an arrangement of apparatus for practicing our invention.

FIG. 1 represents, in exploded form, an electrolytic cell adapted to use in the practice of our invention. End plates 11 and 12 in an embodiment actually used, were of acrylic polymer (known commercially as "Plexiglas," a trade name of Rohm and Haas) ½ inch thick. They were 12 inches square, were drilled near their edges with bolt holes 14 and were provided with tapped holes 16 for insertion of standard pipe fittings or nipples for introduction or removal of fluids. Next to end plates 11 and 12, respectively, were silicone rubber gaskets 18 and 20, having 9" diameter circular openings as represented, in which silicone rubber spacers 22 and 24, respectively, were centrally located, spacers 22 and 24 being 5½ inches in diameter. Next to these were distributor plates 26 and 28, which were made of stainless steel 0.032 inch thick, and had, in addition to the bolt holes for the bolts or tie rods 30, eight holes $\frac{3}{16}$ inch in diameter located arount a 7-inch diameter circle, the holes being located so they did not come in line with the tapped holes 16, as their function was to improve the uniformity of flow between the active area of the cell electrodes and the connections made at the tapped holes 16. Next after distributor plates 26 and 28 were gaskets 32 and 34, respectively, similar to gaskets 18 and 20, and serving to center wire mesh connectors 36 and 38, which were made of stainless steel wire mesh which had been rolled somewhat to render it flatter. External electrical connection to connectors 36 and 38 was provided by stainless steel wires 40 and 42, respectively, which, as indicated, passed between gaskets 32 and 34, respectively, and the next adjacent gaskets 44 and 46. Gaskets 44 and 46 were similar to gaskets 18 and 20, and served to center electrodes 48 and 50, which were disks of finely divided platinum held mechanically by a plastic matrix (trade name, "Teflon"). The middle element of the assembly was an ion-exchange membrane 52, having a diameter somewhat greater than the 9-inch openings in gasket 44 and 46, so that it might be held at its edges by their pressure against it. In order to prevent short-circuiting of any part of the assembly by bolts 30, they were insulated by fluorocarbon (Du Pont trade name "Teflon") cylindrical spacers 54 over the part of their length between end plates 11 and 12. The bolt holes 14 in the end plates were only large enough to pass the tie rods 30; the homologous unnumbered holes in the various gaskets and distributor plates 26 and 28 were larger, in order to accommodate the additional thickness of the cylindrical spacers 54.

Since the electrolysis of water in a cell such as here represented produces approximately twice as large a volume of hydrogen as of oxygen, and since the ion-exchange membrane 52 is not so strong mechanically as to be able to bear any great pressure differential between its two sides, it is ideally preferable to make the volume on one side of the cell as nearly as possible twice the volume on the other side. This may be approximated by making gaskets 18, 32, 44, and spacer 22 half as thick as gaskets 20, 34, 46, and spacer 24. In the case from which the previous dimensions were quoted, these thicknesses were, respectively 1/16 inch and 1/8 inch. Tie rods 30 were secured conventionally by undesignated washers and nuts.

While tapped holes 16 as represented in FIG. 1 are suitable for giving access, respectively, to one point above the liquid surface and one point below, if it is desired to circulate the liquid for the purpose of filtering out suspended material which may appear during electrolysis, it is desirable to provide two points of access below the liquid surface. FIG. 2 represents an end plate having tappings 16a located suitably for this purpose, one tapping 16 in the original location being intended for communication with the volume above the liquid surface.

It will be recognized that the choice of materials of construction and, to a considerable degree, the particular structure employed, are the results of choice of mechanically strong and chemically relatively inert parts, insulating or conducting according to their particular function. Many alternatives are available and completely satisfactory, although not necessarily so readily worked as those actually selected. A satisfactory ion exchange membrane 52 is sold commercially as "Zerolite A-20" by United Water Softeners, Ltd. This may be stabilized in potassium hydroxide solution, of which it will absorb and retain a quantity sufficient to provide adequate conductivity through the membrane. (Two useful and informative references on ion exchange resins are: "Ion Exchange Resins" by R. Kunin, published in 1958 (second edition) by John Wiley & Sons; and "Ion Exchange Technology" by Nachod and Schubert, published in 1956 by the Academic Press, New York City.)

Other useful references on the use of ion-exchange resins in so-called fuel cells are: "Regenerative Ion-Exchange Fuel Cell Systems" by J. S. Bone, Proceedings of the 14th Annual Power Sources Research Conference, U.S. Army Signal Research and Development Laboratory, May 1960; and "Regenerative Ion-Exchange Membrane Fuel Cells" by J. S. Bone, S. Gilman, L. W. Niedrach, and M. D. Read, Fifteenth Annual Power Sources Conference.

Briefly, the cell represented by FIG. 1 functions similarly to older and more conventional electrolytic cells, except for certain modifications in behavior resulting from the mechanical separation between the two half-cells which is produced by membrane 52. Thus, fluid to be electrolyzed must be introduced on both sides of the membrane 52 in order that catalyst electrodes 48 and 50 may both be provided with electrolyte at their points of contact with membrane 52; in a completely conventional electrolytic cell, the electrolyte would be introduced simply into a single chamber. Another characteristic of the ion-exchange cell is that the resin of membrane 52 may be slightly reducing to the oxygen produced, and thus slightly upset the stoichiometric relations between the quantities of hydrogen and oxygen evolved. These special characteristics accompany certain great advantages of such cells; independence of the action of gravity upon a fluid separator to prevent mixing of hydrogen and oxygen; non-submerged electrodes large parts of whose platinum surface may be exposed to gas (during operation as a fuel cell). Since the membrane 52 functions in a sense as a solid electrolyte, operation as a fuel cell causes the water produced by combination of hydrogen and oxygen to appear at the electrode faces and be recovered as it appears in the cell. A more specific explanation of the operation of our invention may best be undertaken by the help of FIG. 3.

In FIG. 3 there are represented by rectangles two similar cells, an electrolyzer 60 and a fuel or recombination cell 62 whose oxygen ports 64 and 66 are connected together by pipe line 68 to which a valve 69 and a reservoir or accumulator 70 is also connected. Similarly the hydrogen ports 72 and 74 of the cells 60 and 62, respectively, are tied together by pipe line 76 to which valve 77 and accumulator 78 are connected. It will be observed that accumulator 78 is represented as approximately twice as large as accumulator 70, in order that storage of the hydrogen and oxygen evolved by electrolysis may produce nearly equal pressures of hydrogen and oxygen. This stratagem is a convenient way of avoiding or delaying the production of pressure differentials between the two sides of a cell, which would be likely to rupture the membrane of the cell (e.g. 52 of FIG. 1).

Terminal 80 of cell 60 is connected to terminal 82 of cell 62 by conductor 84, which has ammeter 85 in its circuit. Terminal 86 of cell 60 is connected to terminal 88 of adjustable-voltage supply 90 by conductor 92; and terminal 94 of cell 62 is connected to terminal 96 of supply 90 by conductor 98. The electrolysis of water requires a potential of roughly two volts, while the recombination of the hydrogen and oxygen thus produced generates a potential of slightly less than a volt. However, the total charge required for electrolysis is very nearly exactly identical with the total charge produced by recombination of the products; the losses in the overall cycle appear primarily as a difference between the applied and the generated voltages. Thus it is simply to supply the losses in the system by connecting fuel cell 62 so that it assists the electrolysis in cell 60, and putting adjustable-voltage supply 90 in series with both, to make up the difference between electrolysis and recombination cell potentials. For example, terminal 80 may be negative with respect to terminal 86; terminal 94 may be positive with respect to terminal 82, and terminal 88 may be positive with respect to terminal 96. By adjusting the potential of supply 90 by the undesignated handwheel thereon represented, the rate of operation, as indicated by the reading of ammeter 85, may be adjusted. If volumes available for hydrogen and for oxygen are nearly enough in the ratio of two to one, operation of the system should produce no objectionable pressure differentials across the cell membranes. However, to protect against such a differential or against excessive pressure in the accumulators, excess pressure switches 100 and 102, and pressure differential switch 104, are represented connected to accumulators 70 and 78. It is assumed that all the switches are so designed that excess pressure, or an excessive pressure difference, will close switch contacts in them. These are represented as connected (in parallel) by line 106 to terminal 108 of adjustable-voltage supply 90; it is assumed that the design of supply 90 is such that closing of switch contacts connected to terminal 108 will cause the supply to cease giving an output.

The fluid input to cell 60 is applied, necessarily at equal pressures, to inlet ports 110 and 112 through pipe system 114 which is connected to constant-level reservoir 116.

Reservoir 116 is provided with an inlet float valve 118, which throttles the input from supply tank 119, whose pressure is raised somewhat above the system operating pressure by pump 120. It is desirable that the liquid level in cell 60 be maintained nearly constant despite variations in the internal pressure in the system which includes the interiors of the cells 60 and 62. The float valve 118 achieves this. For similar reasons, the liquid ports 122 and 124 of cell 62 are connected, together, to tank or reservoir 128, which is equipped with a float valve 130, which discharges the content of tank 128 into receptacle 132 whenever the level of fluid in tank 128 rises above the desired level. Thus it is possible to operate the interior system which includes the inner portions of the cells 60 and 62, and accumulators 70 and 78, at pressures above atmosphere, and yet feed input liquid to tank 119 at atmospheric pressure, and to recover output liquid in container or receptacle 132 at atmospheric pressure.

While simply initiating electrolysis in cell 60 and recombining the products of electrolysis will never leave a net product to build up pressure in tanks 70 and 78, it may be desirable to charge tanks 70 and 78 initially by connecting valves 69 and 77 to sources of high-pressure oxygen and hydrogen, respectively. Then if, later, there is pressure unbalance between the hydrogen and oxygen systems, causing pressure difference switch 104 to stop the electrolysis by shutting down power supply unit 90, an appropriate amount of hydrogen or oxygen to equalize the pressures may be fed in through the appropriate charging valve, 69 or 77. It is, of course, also feasible to change the electrical connections so that a separate source of electrical energy causes the electrolysis to proceed, charging up tanks 70 and 78 (which may be main fuel system tanks on a vehicle), and then at a different time, to apply load to the terminals of cell 62, producing electrical energy and recreating pure water.

Figure 4:
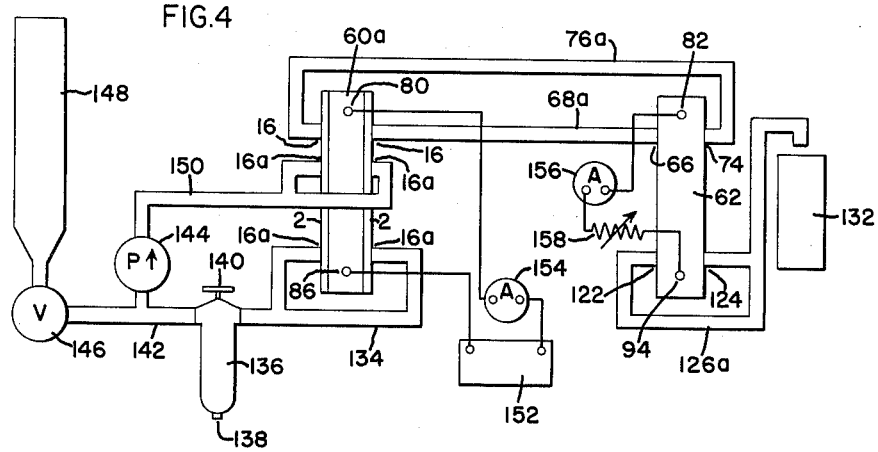
FIG. 4 represents schematically another arrangement of apparatus for practicing our invention.

FIG. 4 represents a cell 60a, similar to the representation 60 of FIG. 3, but provided with end plates in accordance with the detailed representation in FIG. 2. The significant peculiarity of cell 60a is that in each end plate (2), there are provided two liquid ports 16a giving access to the cell below the normal liquid surface. The lower ports 16a are connected by piping system 134 to a filter 136. Filter 136 is not represented by the conventional symbol for a filter, but is represented semi-pictorially as provided with a drain plug 138 and a handle 140; this is a representation of a commercially available filter commonly employed for filtering crankcase oil in internal combustion engines and also for filtering fuel oil before introduction into oil burners. Such a filter has the advantageous characteristic that it is composed of filter elements which, by rotation of the handle 140, can be scraped clean of filtered solids which thereupon drop into a sump in the buttom of the filter housing, from which they may conveniently be drained off by removal of plug 138. The outlet from filter 136 is connected by a piping system 142 to a pump 144 and to a valve 146, which is connected to a raw (or impure) fluid reservoir 148. The outlet of pump 144 is connected by a piping system 150 to the two upper ones of liquid ports 16a. During operation of cell 60a as an electrolytic cell, operation of pump 144 will cause a continuous circulation of cell liquid through filter 136, where any sediment resulting from the continuing electrolysis will be filtered out and may be removed, at suitable intervals, by rotation of handle 140, and removal by removal of plug 138. It has been found experimentally that sediment accumulates only slowly during continuing electrolysis of human urine, and the provision of circulation and filtration permits long periods of continuous operation without trouble from accumulation of solids. Additional raw liquid may be fed in from reservoir or storage tank 148 by opening of valve 146, which will permit the ingress of raw liquid to the low-pressure side of pump 144. Since the particular desirable circulation and filtration features represented in FIG. 4 may be incorporated in any embodiment of our invention to which cell 60 might be applied as, for example, FIG. 3, the electrical connections and the recombination device have been represented very simply, for completeness. Terminals 80 and 86 of cell 60a are represented as connected to a direct-current source 152, with an ammeter 154 in the circuit to measure the current fed to the cell 60a. The gas outlet ports 16 of cell 60a are represented as connected by pipes 68a and 76a (strongly similar to 68 and 76 of FIG. 3) to cell 62, which may be identical with the representation in FIG. 3. The liquid outlet of cell 62 is through pipe system 126a which discharges directly into container 132. The electrical output of cell 62, instead of being fed back to assist in the electrolysis, as in FIG. 3, is utilized (passing through ammeter 156) in a load represented as variable resistor 158, which may be adjusted so that the current through ammeter 156 is as great as that through ammeter 154. This representation of the manner of recirculating and filtering the electrolyte in cell 60a has been drawn up to show operation at approximately atmospheric pressure; it is, of course, evident that an arrangement similar to that of FIG. 4 may be used to permit recirculation of electrolyte in a cell operating at high pressure. Alternatively, the electrolytic cell 60a may be operated at low pressure, and the gases produced may be compressed by compressors into high-pressure tanks such as 70 and 78 of FIG. 3.

Specifically, in the practice of our invention, urine is introduced into the electrolyzer cell of the system, and is electrolyzed. The hydrogen and oxygen thus produced are recombined in the recombination or fuel cell of the system, the recombination producing water at the electrode-membrane interface, whence it drains to the exit system. We have found that continuing addition of new raw material to be processed may continue without any necessity for draining the electrolysis cell and without any particular problems for a period long enough for electrolysis of many cell volumes. Because the useful water content of the urine is removed by electrolysis into gases, no physical carryover of impurities (including germs) can occur so long as precautions are taken against entrainment of non-gases by the emerging gases. Water produced by this method has proven, upon analysis, to be perfectly potable. Whatever electrolytes other than water are present in such liquid, water-containing, biological waste, they have been found, even when concentrated, to be insufficient to interfere with the electrolysis by producing deleterious quantities of impurities in the gases. The nature of the process is such that a closed system may be used conveniently, and kept under exact controls; there are no thermal or other lags in changing the rate of reaction. Operation of this system entails no losses of water except for any slight loss caused by oxidation of the membrane, and the final loss of one cell content of liquid when it ultimately becomes necessary to "blow down" or drain the concentrated impurities accumulated in the electrolytic cell after a long time of operation, as by removal of plug 135 of FIG. 4.

What is claimed is:

1. The process of producing potable water from urine which comprises the step of electrolyzing the said urine in an electrolysis cell to produce hydrogen and oxygen and the step of recombining the said hydrogen and oxygen in a fuel or recombination cell to produce potable water and electrical energy.

2. The process of producing purified water from urine which comprises the steps of
   (a) electrolyzing a first portion of the said urine in an electrolysis cell whereby the water present in the said urine is removed;
   (b) replenishing the said first portion of urine with additional portions of urine;
   (c) filtering the urine in the said electrolysis cell to remove solids precipitating therefrom;

(d) leading the gaseous products of the said electrolysis to a fuel cell and recombining them there to form purified water, with generation of electrical energy;
(e) applying the said electrical energy to the electrolysis of said urine;
(f) withdrawing the said purified water from the said fuel cell, as a product.

3. The process of producing purified water from urine which comprises the steps of
(a) continuously feeding said urine into an electrolysis cell to maintain a constant level of urine therein;
(b) electrolyzing the water in said urine into hydrogen and oxygen;
(c) continuously circulating urine contained in said electrolysis cell through a filter to remove solids therefrom;
(d) leading the said hydrogen and oxygen to a fuel cell and there recombining them to form purified water, with generation of electrical energy;
(e) applying the said electrical energy to the said electrolysis cell;
(f) withdrawing the said purified water from the said fuel cell, as a product.

References Cited by the Examiner

UNITED STATES PATENTS

| 2,130,789 | 9/1938 | Campbell | 204—149 |
| 2,384,463 | 9/1945 | Gunn et al. | 136—86 |
| 2,852,455 | 9/1958 | Housner | 204—228 |
| 2,925,455 | 2/1960 | Eidensohn et al. | 136—86 |

FOREIGN PATENTS

| 5,030 of 1879 | 12/1879 | Great Britain. |
| 6,417 of 1887 | 5/1888 | Great Britain. |

OTHER REFERENCES

Chemical Abstracts, 24; 145 (1930).
German Auslegeschrift No. 1,051,820 March 5, 1959, R17,752 IVa/12i.

JOHN H. MACK, *Primary Examiner.*

MURRAY TILLMAN, *Examiner.*

GERALD KAPLAN, L. G. WISE, H. FLOURNOY,
*Assistant Examiners.*